United States Patent
Kim et al.

(10) Patent No.: US 9,380,406 B2
(45) Date of Patent: Jun. 28, 2016

(54) METHOD AND APPARATUS FOR PROXIMITY-BASED SERVICE

(71) Applicant: LG ELECTRONICS INC., Seoul (KR)

(72) Inventors: Sanggook Kim, San Diego, CA (US); Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 14/287,887

(22) Filed: May 27, 2014

(65) Prior Publication Data
US 2015/0049684 A1 Feb. 19, 2015

Related U.S. Application Data

(60) Provisional application No. 61/865,967, filed on Aug. 14, 2013, provisional application No. 61/866,504, filed on Aug. 15, 2013.

(51) Int. Cl.
*H04W 4/00* (2009.01)
*H04W 72/04* (2009.01)

(52) U.S. Cl.
CPC .............. *H04W 4/008* (2013.01); *H04W 4/005* (2013.01); *H04W 72/042* (2013.01)

(58) Field of Classification Search
CPC ... H04W 4/005; H04W 4/008; H04W 72/042; H04W 4/08; H04W 4/023; H04W 76/023; H04W 8/005; H04W 72/08; H04W 48/12; H04W 72/04; H04L 1/1854
See application file for complete search history.

(56) References Cited

U.S. PATENT DOCUMENTS

| | | | | |
|---|---|---|---|---|
| 9,185,690 | B2* | 11/2015 | Khoshnevis | ........ H04W 72/042 |
| 2013/0229957 | A1* | 9/2013 | Sartori | .................. H04W 72/04 370/281 |
| 2014/0003262 | A1* | 1/2014 | He | ........................ H04W 28/08 370/252 |

(Continued)

FOREIGN PATENT DOCUMENTS

WO    WO 2013/009089 A2    1/2013
WO    WO 2013/089452 A1    6/2013

OTHER PUBLICATIONS

Alcatel-Lucent, "Prose Identifiers Used for Solutions 6.1.6 and 6.1.7 and 6.2.2 of TR 23.703," SA WG2 Meeting S2#98, S2-132564, Valencia, Spain, Jul. 15-19, 2013, pp. 1-4.

LTE Advanced, "3rd Generation Partnership Project; Technical Specification Group Services and System Aspects; Feasibility study for Proximity Services (ProSe) (Release 12)," 3GPP TR 22.803 V12.2.0, Jun. 2013, pp. 1-46.

(Continued)

*Primary Examiner* — Hoang-Chuong Vu
(74) *Attorney, Agent, or Firm* — Birch, Stewart, Kolasch & Birch, LLP

(57) ABSTRACT

The present invention is directed to a method and an apparatus for use in a wireless communication system. Specifically, the present invention is directed to a method of performing a ProSe communication by a UE in a cellular communication system and an apparatus therefore, in which the method comprises: receiving, from a BS, a first PDCCH signal including scheduling information and a CRC, wherein the CRC is masked with a ProSe-related ID; receiving, from the BS, a PDSCH signal using the scheduling information, wherein the PDSCH signal includes WLAN resources and information available for the ProSe communication; establishing a ProSe connection with a peer UE by using the WLAN resources and information; and exchanging WLAN radio signals with the peer UE in accordance with the ProSe connection, wherein the UE is configured to keep monitoring a second PDCCH signal during the WLAN radio signals are exchanged.

26 Claims, 18 Drawing Sheets

(56) References Cited

U.S. PATENT DOCUMENTS

| | | | |
|---|---|---|---|
| 2014/0148201 A1* | 5/2014 | Kuo | H04W 4/008 455/456.3 |
| 2014/0164864 A1* | 6/2014 | Takeda | H04L 1/1854 714/749 |
| 2014/0295868 A1* | 10/2014 | Lee | H04W 76/046 455/452.1 |
| 2015/0043448 A1* | 2/2015 | Chatterjee | H04W 8/005 370/329 |

OTHER PUBLICATIONS

LTE Advanced, "3rd Generation Partnership Projects; Technical Specification Group Services and Sytem Aspects; Study on architecture enhancements to support Proximity Services (ProSe) (Release 12)," 3GPP TR 23.703 V0.4.1, Jun. 2013, pp. 1-86.

* cited by examiner

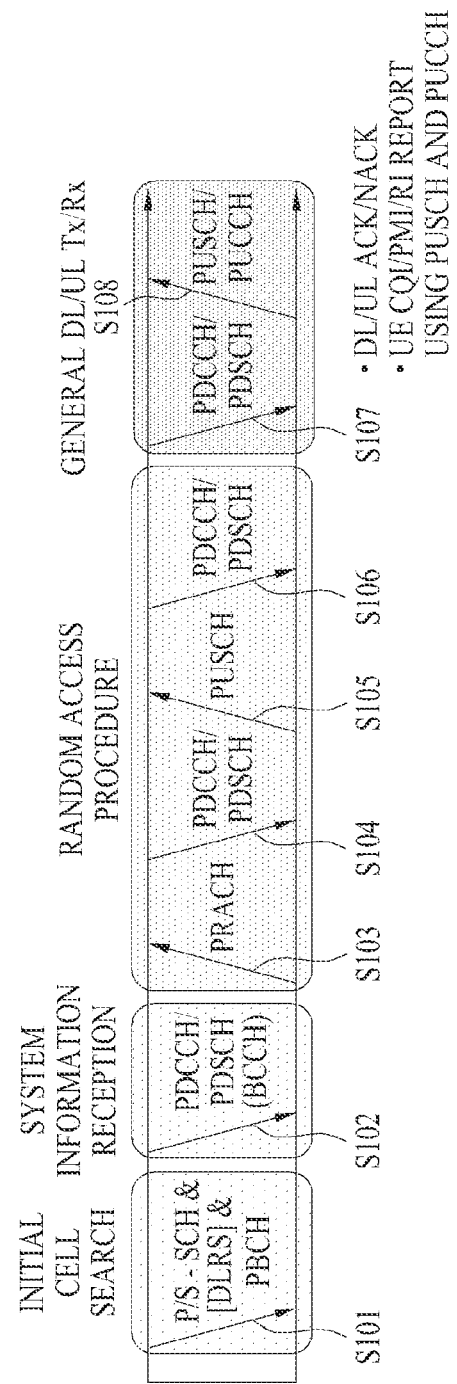

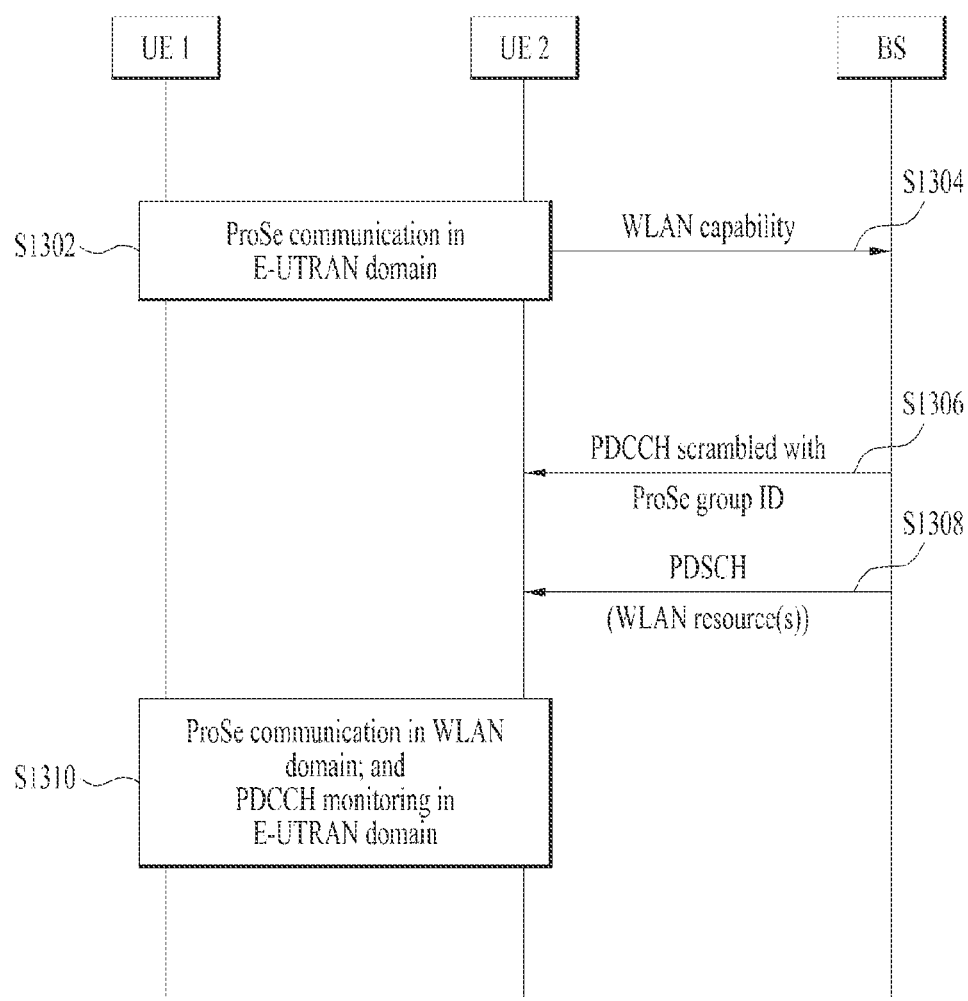

METHOD AND APPARATUS FOR PROXIMITY-BASED SERVICE

This application claims the benefit of U.S. provisional application 61/865,967, filed on Aug. 14, 2013, and U.S. provisional application 61/866,504, filed on Aug. 15, 2013, which are hereby incorporated by reference as if fully set forth herein.

TECHNICAL FIELD

The present invention is directed to a method and an apparatus for use in a wireless communication system. Specifically, the present invention is directed to a method and an apparatus for proximity-based service.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and an apparatus of efficiently managing a Proximity-based Service (ProSe) communication, preferably off-loading a ProSe communication between E-UTRAN and WLAN.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of performing a Proximity-based Service (ProSe) communication by a User Equipment (UE) in a cellular communication system is provided, in which the method comprises: receiving, from a Base Station (BS), a first Physical Downlink Control Channel (PDCCH) signal including scheduling information and a Cyclic Redundancy Check (CRC), wherein the CRC is masked with a ProSe-related identifier (ID); receiving, from the BS, a Physical Downlink Shared Channel (PDSCH) signal using the scheduling information, wherein the PDSCH signal includes Wireless Local Area Network (WLAN) resources available for the ProSe communication; establishing a ProSe connection with a peer UE by using the WLAN resources; and exchanging WLAN radio signals with the peer UE in accordance with the ProSe connection, wherein the UE is configured to keep monitoring a second PDCCH signal during the WLAN radio signals are exchanged.

Preferably, the WLAN resources available for the ProSe communication may further include WLAN band information and WLAN channel information.

Preferably, the establishing the ProSe connection may include: transmitting a probe request message for initiating a WLAN direct communication in a WLAN band and a WLAN channel indicated by the MILAN band information and the WLAN channel information of the PDSCH signal.

Preferably, the PDSCH signal may further include timing information indicating a time instant at which a procedure for establishing the ProSe connection through WLAN is allowed.

Preferably, the PDSCH signal may further include IP addresses of UEs for the ProSe communication or device addresses of UEs for the ProSe communication.

Preferably, the establishing the ProSe connection may include: setting up IP configuration by using the IP addresses or the device addresses in the PDSCH signal.

Preferably, the PDSCH signal may further include security information.

Preferably, the establishing the ProSe connection may include: performing a Wi-Fi Protected Setup (WPS) provisioning procedure by using the security information in the PDSCH Preferably, the PDSCH signal may further include information indicating a group owner for the ProSe connection in WLAN domain.

Preferably, the PDSCH signal may further include a WLAN group ID.

Preferably, the method further includes: reporting WLAN capability of the UE to the BS, wherein the WLAN capability includes first information indicating whether WLAN is supported or not.

Preferably, if the UE supports WLAN, the WLAN capability may further include second information indicating one or more supportable WLAN versions.

Preferably, the second PDCCH signal may include a PDCCH signal for paging, and paging occasions are determined by using the ProSe-related ID.

As another aspect of the invention, a User Equipment (UE) configured to perform a Proximity-based Service (ProSe) communication in a cellular communication system is provided, in which the UE comprises: a radio frequency (Rf) unit; and a processor, wherein the processor is configured to: receive, from a Base Station (BS), a first Physical Downlink Control Channel (PDCCH) signal including scheduling information and a Cyclic Redundancy Check (CRC), wherein the CRC is masked with a ProSe-related Identifier (ID), receive, from the BS, a Physical Downlink Shared Channel (PDSCH) signal using the scheduling information, wherein the PDSCH signal includes Wireless Local Area Network (WLAN) resources available for the ProSe communication; establish a ProSe connection with a peer UE by using the WLAN resources, and exchange WLAN radio signals with the peer UE in accordance with the ProSe connection, wherein the UE is configured to keep monitoring a second PDCCH signal during the WLAN radio signals are exchanged.

Preferably, the WLAN resources available for the ProSe communication may further include WLAN band information and WLAN channel information.

Preferably, the establishing the ProSe connection may include: transmitting a probe request message for initiating a WLAN direct communication in a WLAN band and a WLAN channel indicated by the WLAN band information and the WLAN channel information of the PDSCH signal.

Preferably, the PDSCH signal may further include timing information indicating a time instant at which a procedure for establishing the ProSe connection through WLAN is allowed.

Preferably, the PDSCH signal may further include IP addresses of UEs for the ProSe communication or device addresses of UEs for the ProSe communication.

Preferably, the establishing the ProSe connection may include: setting up IP configuration by using the IP addresses or the device addresses in the PDSCH signal.

Preferably, the PDSCH signal may further include security information.

Preferably, the establishing the ProSe connection may include: performing a Wi-Fi Protected Setup (WPS) provisioning procedure by using the security information in the PDSCH signal.

Preferably, the PDSCH signal may further include information indicating a group owner for the ProSe connection in WLAN domain.

Preferably, the PDSCH signal may further include a WLAN group ID.

Preferably, the processor may be further configured to: report WLAN capability of the UE to the BS, wherein the WLAN capability includes first information indicating whether WLAN is supported or not.

Preferably, if the UE supports WLAN, the WLAN capability may further include second information indicating one or more supportable WLAN versions.

Preferably, the second PDCCH signal may include a PDCCH signal for paging, and paging occasions are determined by using the ProSe-related ID.

Advantageous Effects

Exemplary embodiments of the present invention have the following effects. In accordance with the embodiments of the present invention, an efficient procedure for managing a Proximity-based Service (ProSe) communication, preferably off-loading ProSe communication between E-UTRAN and WLAN is provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings which are included to provide a further understanding of the invention, illustrate embodiments of the invention and together with the description serve to explain the principle of the invention.

FIG. 4 shows physical channels used in a 3rd Generation Partnership Project (3GPP) Long Term Evolution/Long Term Evolution Advanced (LTE/LTE-A) system as an exemplary wireless communication system and a signal transmission method using the same.

FIG. 13 shows an example of off-loading ProSe communication from E-UTRAN to WLAN in accordance with the present invention.

MODE FOR INVENTION

Reference will now be made in detail to the preferred embodiments of the present invention referring to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is apart of the Universal Mobile Telecommunications System (UMTS). 3rd Generation Partnership Project (3GPP) Long Term Evolution (LTE) is a part of Evolved UMTS (E-UMTS) that uses E-UTRA as a radio access. The LTE-Advanced (LTE-A) is an evolved version of 3GPP LTE.

Although the following embodiments of the present invention will hereinafter describe inventive technical characteristics on the basis of 3GPP LTE/LTE-A system, it should be noted that the following embodiments will be disclosed only for illustrative purposes and the scope and spirit of the present invention are not limited thereto. LTE/LTE-A may be interchangeably used with E-UMTS/E-UTRAN. Specific terms used for the exemplary embodiments of the present invention are provided to aid in understanding of the present invention. The specific terms may be replaced with other terms within the scope and spirit of the present invention.

Figure 1:
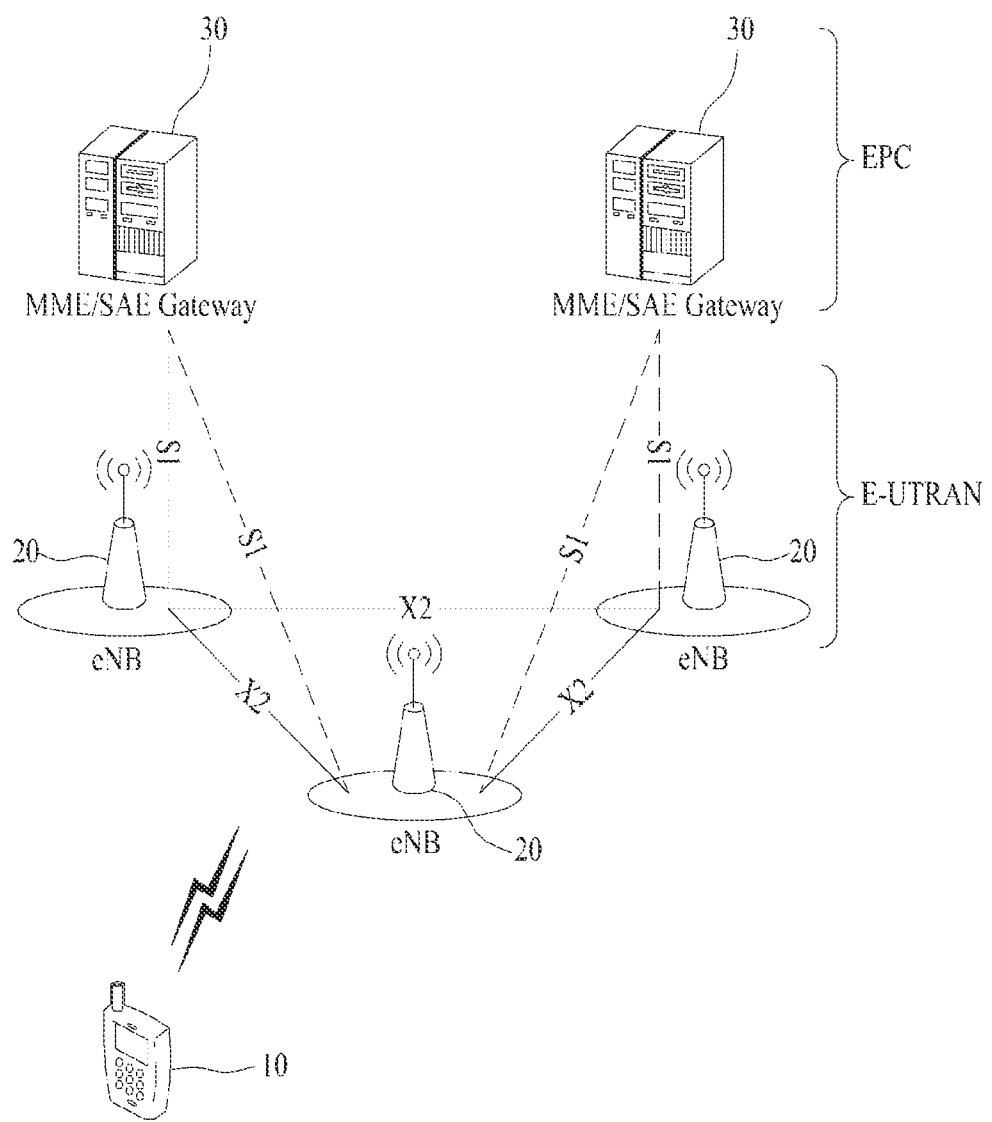
FIG. 1 shows a network structure of an Evolved Universal Mobile Telecommunication System (E-UMTS).

FIG. 1 illustrates a network structure of an E-UMTS. The E-UMTS is widely deployed to provide a variety of communication services such as packet-switched voice and data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "DownLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
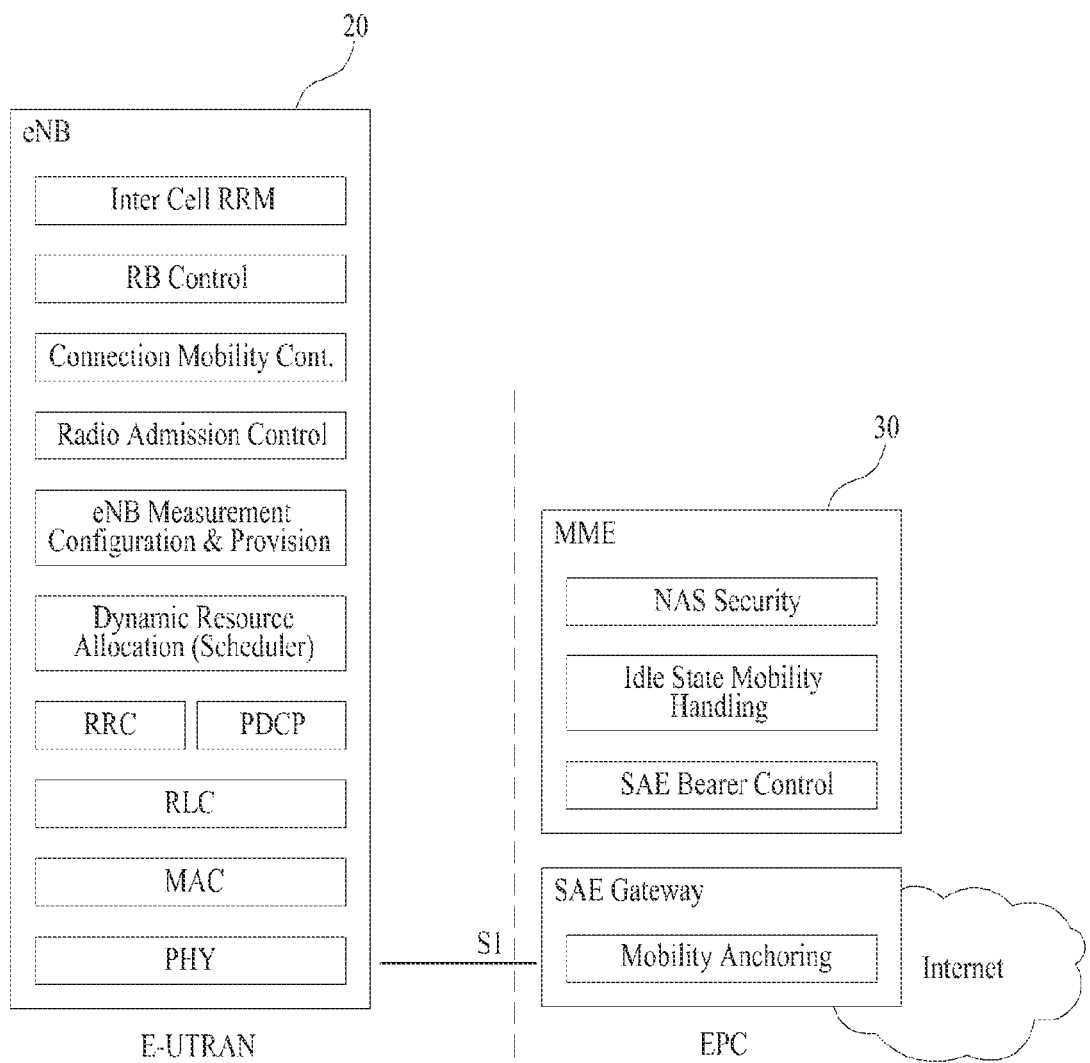
FIG. 2 shows a general structure of a typical Evolved UMTS Terrestrial Radio Access Network (E-UTRAN) and that of a typical Evolved Packet Core (EPC).

FIG. 2 is a block diagram depicting general structures of an E-UTRAN and an EPC. In the description, E-UTRAN may be replaced with LTE/LTE-A. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
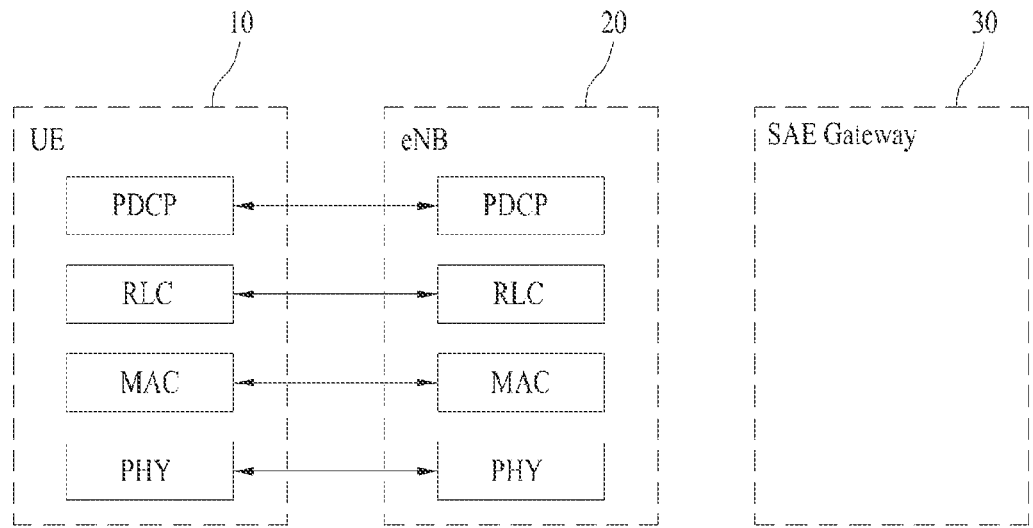
FIGS. 3A-3B show a user-plane protocol and a control-plane protocol stack for the E-UMTS network.
Figure 3B:
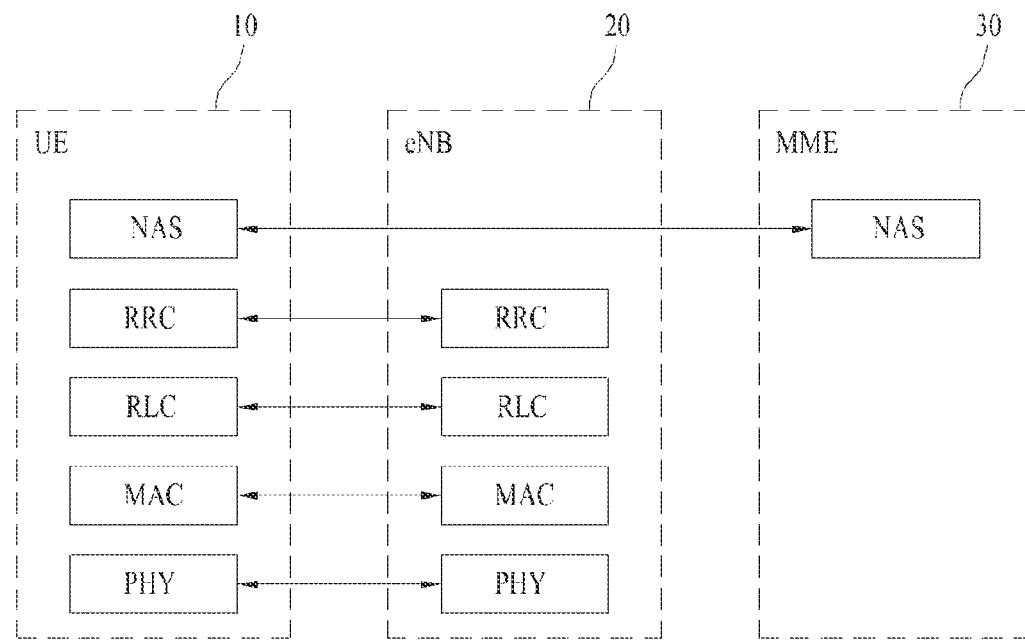

FIGS. 3A~3B illustrate the user-plane protocol and the control-plane protocol stack for the E-UMTS network. Referring to FIGS. 3A~3B, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3A~3B as being separate from the MAC layer, it is understood that the functions of the RLC layer may be performed by the MAC layer and that, therefore, a separate RLC layer is not required. Referring to FIG. 3A, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3B, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RABs). Here, the RAB means a service provided by the second layer (L2) for data transmission between the terminal and the E-UTRAN.

Referring to FIG. 3A, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3B, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RAB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution—Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

FIG. 4 shows physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a Cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the meantime, the UE may check a downlink channel status by receiving a Downlink Reference Signal (DLRS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called Uplink Control Information (UCI). The UCI may include a Hybrid Automatic Repeat reQuest Acknowledgement/Negative Acknowledgement (HARQ ACK/NACK) signal, a Scheduling Request (SR), Channel State Information (CST), etc. The CSI includes a channel quality indicator (CQI), a Precoding Matrix Index (PMI), a Rank Indicator (RI), etc. While the UCI is transmitted through a PUCCH in general, it may be transmitted through a PUSCH when control information and traffic data need to be simultaneously transmitted. The UCI may be a-periodically transmitted through a PUSCH at the request/instruction of a network.

Figure 5:
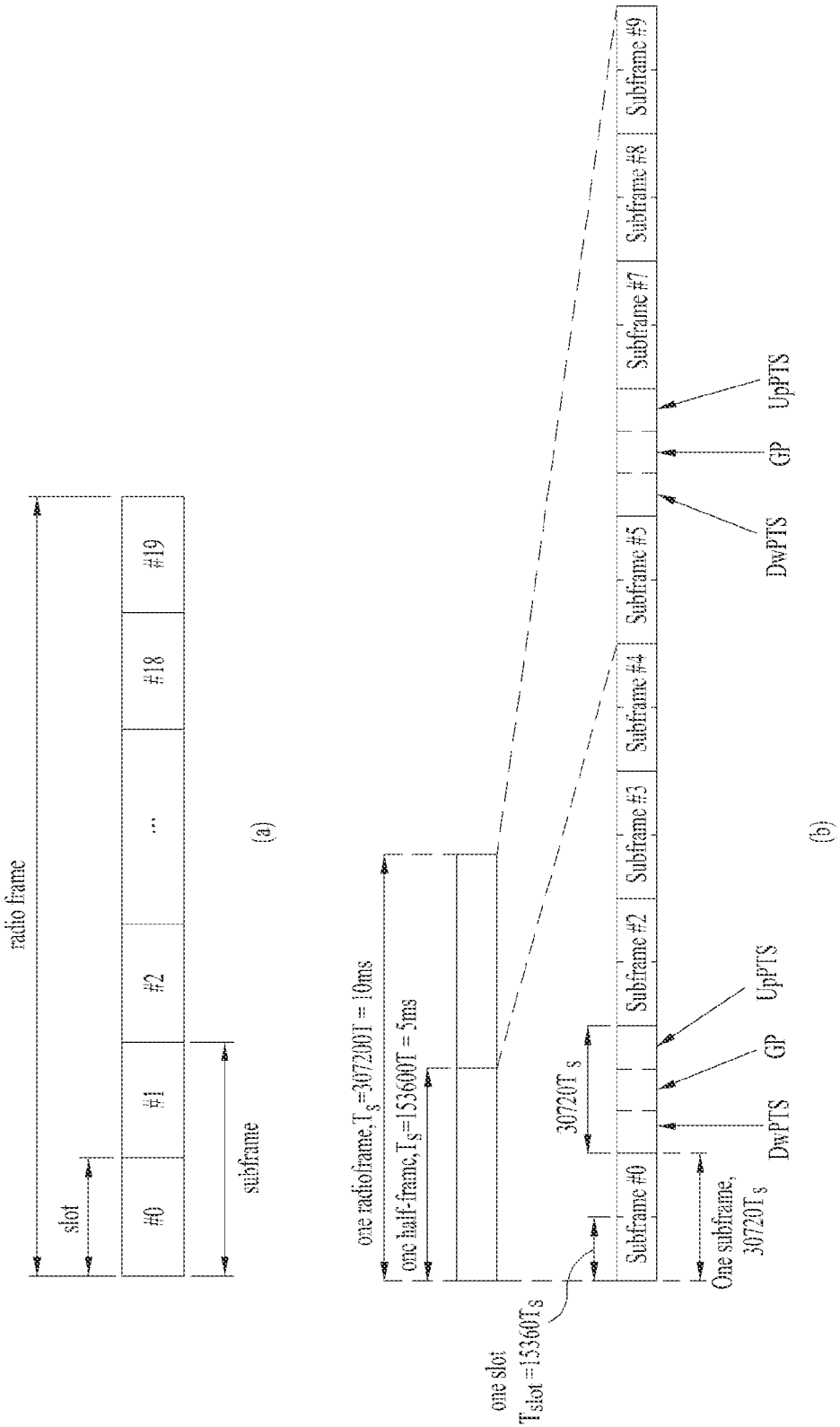
FIG. 5 shows a radio frame structure.

FIG. 5 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure for FDD (Frequency Division Duplex) and a type-2 radio frame structure for TDD (Time Division Duplex).

FIG. 5(*a*) illustrates a type-1 radio frame structure. A downlink frame includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3(3PP LTE, an OFDM symbol represents a symbol period. An RB as a resource allocation unit may include a plurality of consecutive subcarriers in one slot.

The number of OFDNI symbols included in one slot may depend on Cyclic Prefix (CP) configuration. When an OFDM symbol is configured with a normal CP, for example, the number of OFDM symbols included in one slot may be 7. When an OFDM symbol is configured with an extended CP, the length of one OFDM symbol increases, and thus the number of OFDM symbols included in one slot is smaller than that in case of the normal CP. In case of the extended CP, the number of OFDM symbols allocated to one slot may be 6. When a delay spread is large such as in Single Frequency Network (STN) Multimedia Broadcast Multicast Service (MBMS) where multiple cells transmit the same MBMS contents, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 5(*b*) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS). The DwPTS is used for initial cell search, synchronization or channel estimation. The UPPTS is used for channel estimation in a BS and UL transmission synchronization acquisition in a UE. The GP eliminates UL interference caused by multipath delay of a DL signal between a UL and a DL.

Figure 6:
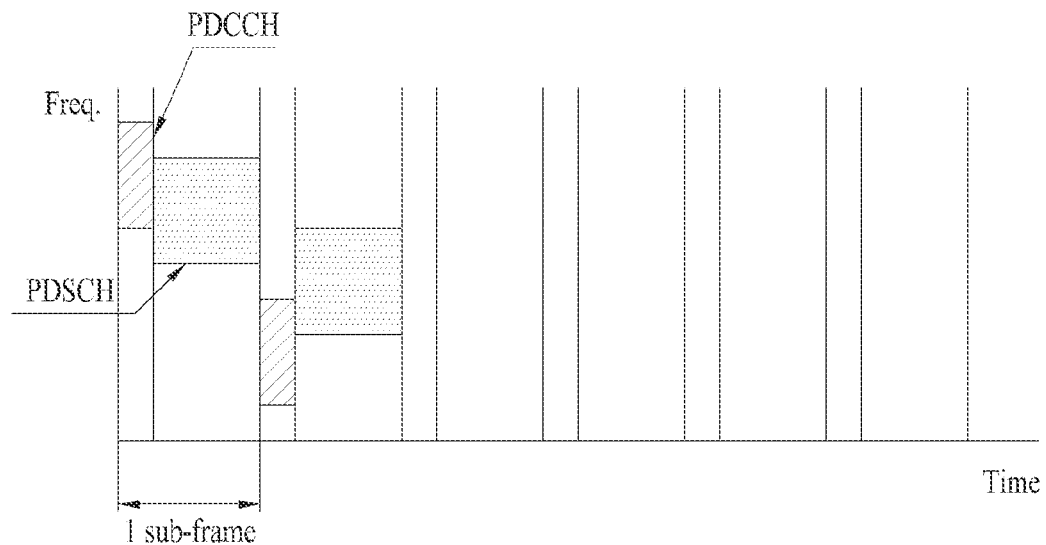
FIG. 6 shows a downlink subframe and physical channels.

FIG. 6 illustrates a downlink subframe and physical channels.

Referring to FIG. 6, the downlink subframe includes a plurality of slots (e.g., two). The number of OFDM symbols included in one slot may be changed according to the length of a Cyclic Prefix (CP). For example in case of a normal CP, the slot may include seven OFDM symbols. The downlink subframe is divided into a data region and a control, region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality or PDCCHs. A PDCCH is transmitted as an aggregate of one or more contiguous Control Channel Elements (CCEs). A CCE consists of 36 Resource Elements (REs) and, in turn, 9 Resource Element Groups (REGs) with 4 REs each. The number of CCEs used for a PDCCH is referred to as the aggregation level. One, two, four, or eight CCEs may be used for a PDCCH depending on the payload size of the control information on PDCCH and channel-coding rate. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

Figure 7:
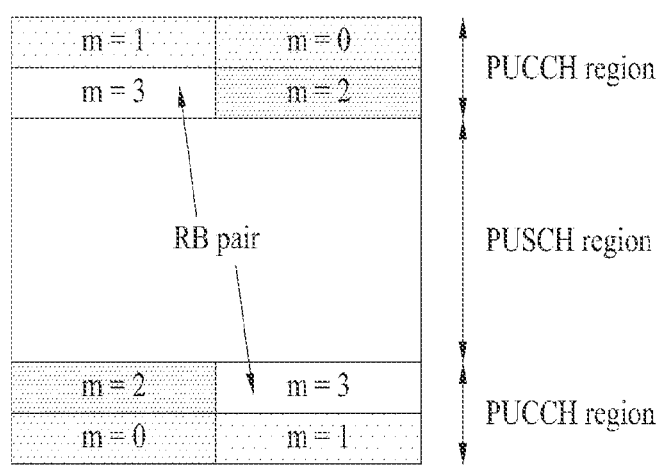
FIG. 7 shows an uplink subframe and physical channels.

FIG. 7 illustrates a structure of a UL subframe.

Referring to FIG. 7, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The UL control information (that is, UCI) includes HARQ ACK/NACK, Channel Quality Information (COI), Precoding Matrix Indicator (PMI) and Rank Indication (RI)

Figure 8:
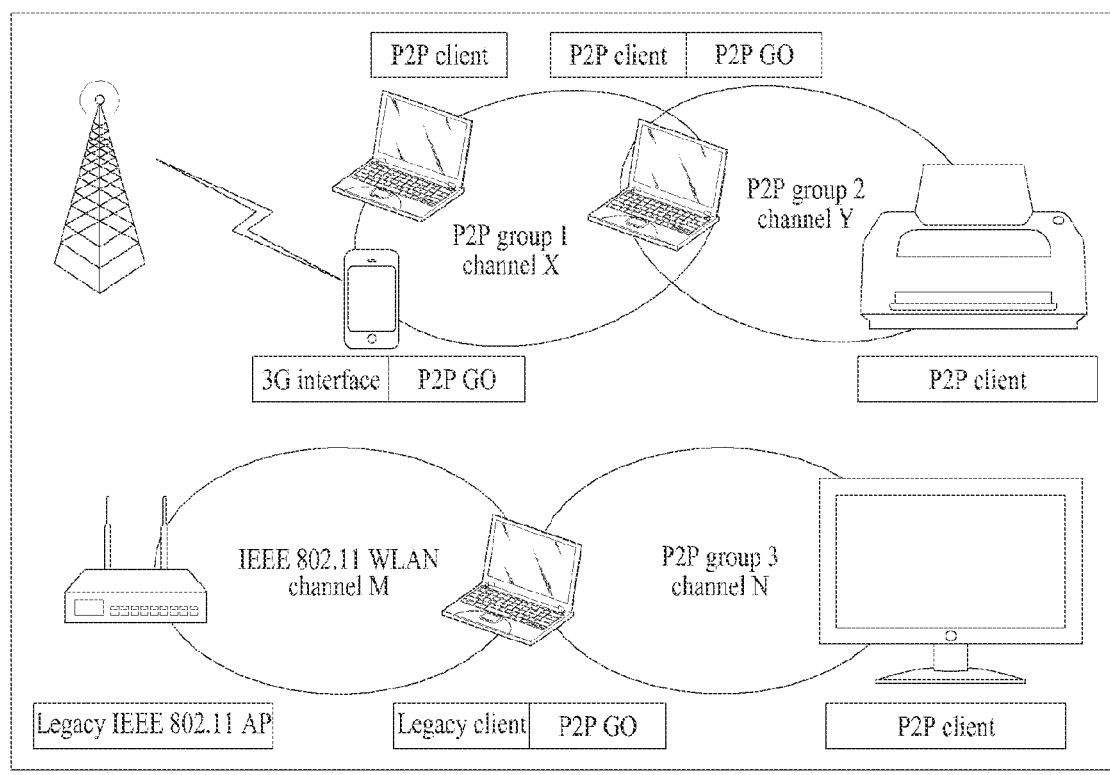
FIG. 8 shows an example of Wireless Fidelity (Wi-Fi) direct supported topologies and use cases.

FIG. 8 shows an example of Wi-Fi direct supported topologies and use cases. Wi-Fi Direct (WFD) is the technology defined in Wi-Fi Alliance to support direct communications in WLAN domain. Wi-Fi Direct devices (known as Peer-to-Peer P2P Devices) communicate by establishing P2P Groups, which are functionally equivalent to traditional Wi-Fi infrastructure networks. The device implementing AP-like functionality in the P2P Group is referred to as the P2P Group Owner (P2P GO), and devices acting as clients are known as P2P Clients. Given that these roles are not static, when two P2P devices discover each other they negotiate their roles (P2P Client and P2P GO) to establish a P2P Group. Once the P2P Group is established, other P2P Clients can join the group as in a traditional Wi-Fi network. Legacy clients can also communicate with the P2P GO, as long as they are not 802.11b only devices and support the required security mechanisms. Legacy devices do not belong to the P2P Group and do not support the enhanced functionalities defined in Wi-Fi Direct, but they simply "see" the P2P GO as a traditional AP. Like a traditional AP, a P2P GO announces itself through beacons, and has to support power saving services for its associated clients. The P2P GO is also required to run a Dynamic Host Configuration Protocol (DHCP) server to provide P2P Clients with Internet Protocol (IP) addresses.

Referring to FIG. 8, the upper part shows a scenario with two P2P groups. The first group is created by a mobile phone sharing its 3G Connection with two laptops; for this first group, the phone is acting as P2P GO while the two laptops behave as P2P Clients. To extend the network, one of the laptops establishes a second P2P Group with a printer; for this second group, the laptop acts as P2P GO. To act both as P2P Client and as P2P GO, the laptop may alternate between the two roles by time-sharing the Wi-Fi interface. The lower part shows the case of a laptop accessing the Internet through a legacy infrastructure AP while at the same time streaming content to a TV set by establishing a P2P Group, where the laptop acts as P2P GO.

Figure 9A:
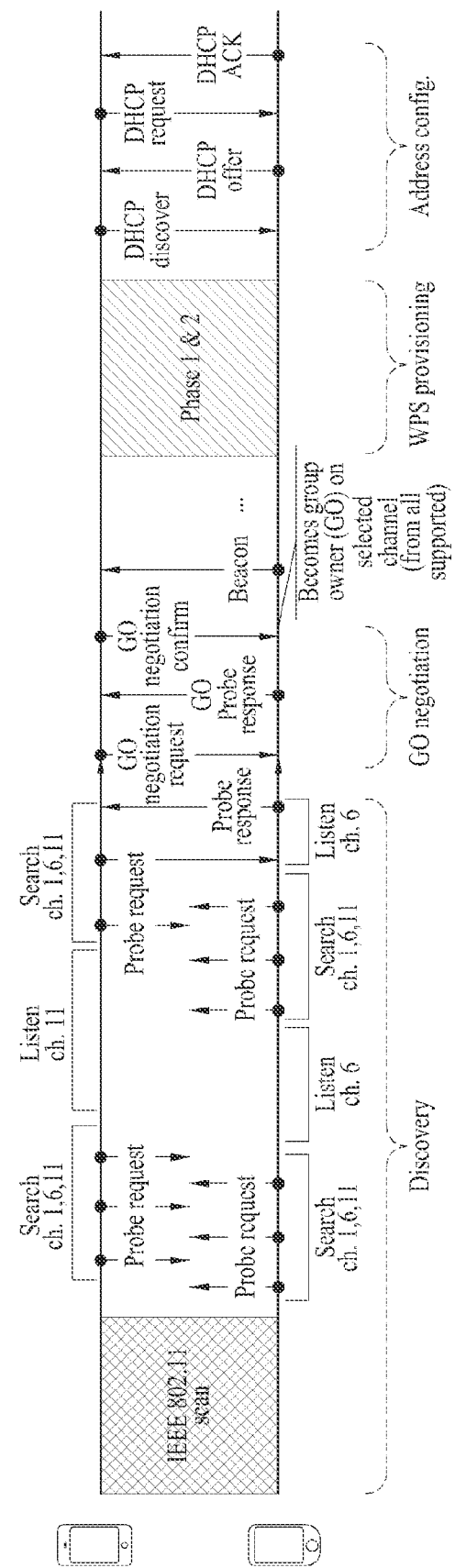
FIGS. 9A-9C show procedures for Peer-to-Peer (P2P) Group formation in a Wi-Fi network.
Figure 9B:
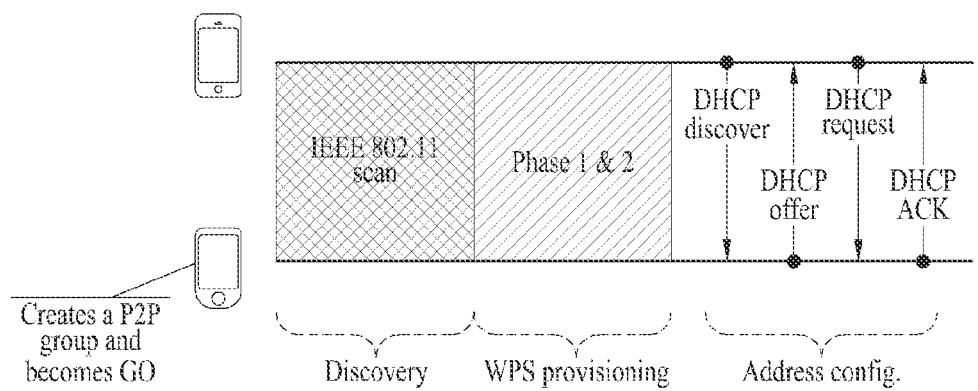
Figure 9C:
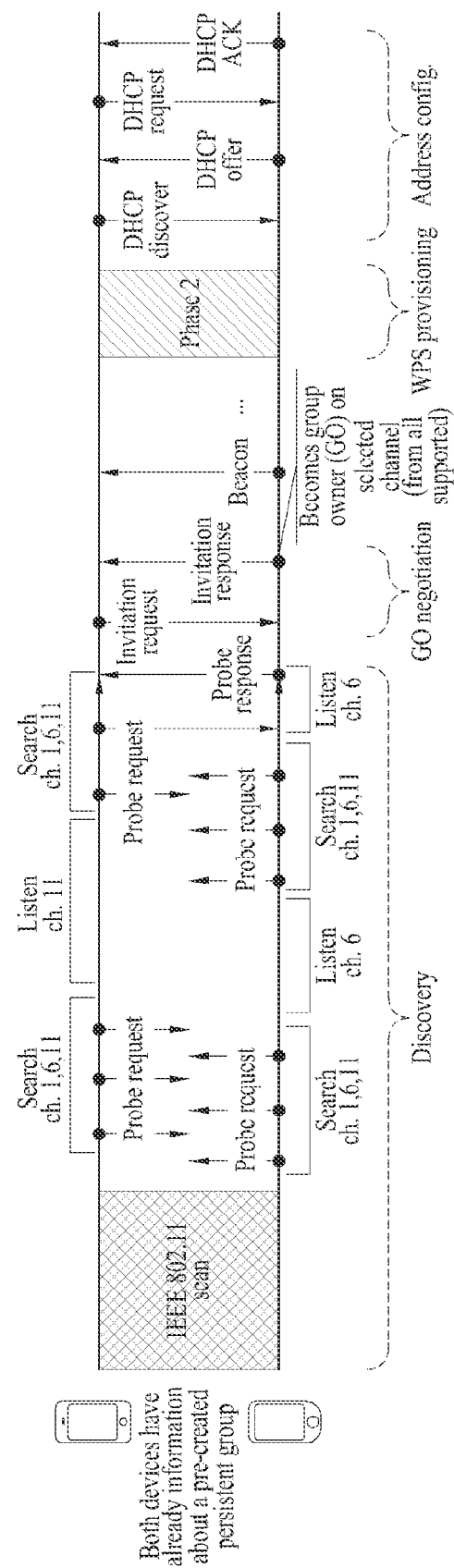

FIGS. 9A~9C show procedures for P2P Group formation in a Wi-Fi network. There are several ways in which two devices can establish a P2P Group, depending on, e.g., if they have to negotiate the role of P2P GO, or if there is some pre-shared security information available.

FIG. 9A shows a procedure for a standard P2P Group formation. P2P Devices discover each other, and then negotiate which device will act as P2P GO. Referring to FIG. 9A, the P2P Devices usually start by performing Wi-Fi scan (active or passive). After the scan, a P2P Device selects one of social channels (e.g., channels 16, or 11 in the 2.4 GHz band) as its Listen channel. Then, the P2P Device alternates between two states: a search state, in which the device performs active scanning by sending Probe Requests in each of the social channels; and a listen state, in which the device listens for Probe Requests in its listen channel to respond with Probe Responses. The amount of time that a P2P Device spends on each state is randomly distributed, typically between 100 ms and 300 ms. Once two P2P Devices have found each other, they start GO Negotiation phase (e.g., GO Negotiation Request/Response/Confirmation), whereby the two devices agree on which device will act as P2P GO. Once the devices have discovered each other and agreed on the respective roles, the next phase is to establish a secure communication using Wi-Fi Protected Setup (WPS Provisioning phase). Final phase is a DHCP exchange to set up the IP configuration (Address config. phase).

FIG. 9B shows a procedure for an autonomous P2P group formation. Referring to FIG. 9B, a P2P Device may autonomously create a P2P Group, where it immediately becomes the P2P GO, by sitting on a channel and starting to beacon. Other devices can discover the established group using traditional scanning mechanisms, and then directly proceed with the WPS Provisioning and Address Configuration phases. Compared to FIG. 9A, the discovery phase is simplified as the device establishing the group does not alternate between search and listen states, and no GO Negotiation phase is required.

FIG. 9C shows a procedure for a persistent P2P group formation. Referring to FIG. 9C, during the formation process, P2P devices can declare a group as persistent, by using a flag in the P2P Capabilities attribute present in Beacon frames, Probe Responses and GO negotiation frames. In this way, the devices forming the group store network credentials and the assigned P2P GO and Client roles for subsequent re-instantiations of the P2P group. Specifically, after the discovery phase, if a P2P Device recognizes to have formed a persistent group with the corresponding peer in the past, any of the two P2P devices can use the Invitation Procedure (a two-way handshake) to quickly re-instantiate the group. The GO Negotiation phase is replaced by the invitation exchange, and the WPS Provisioning phase is significantly reduced because the stored network credentials can be reused.

Figure 10:
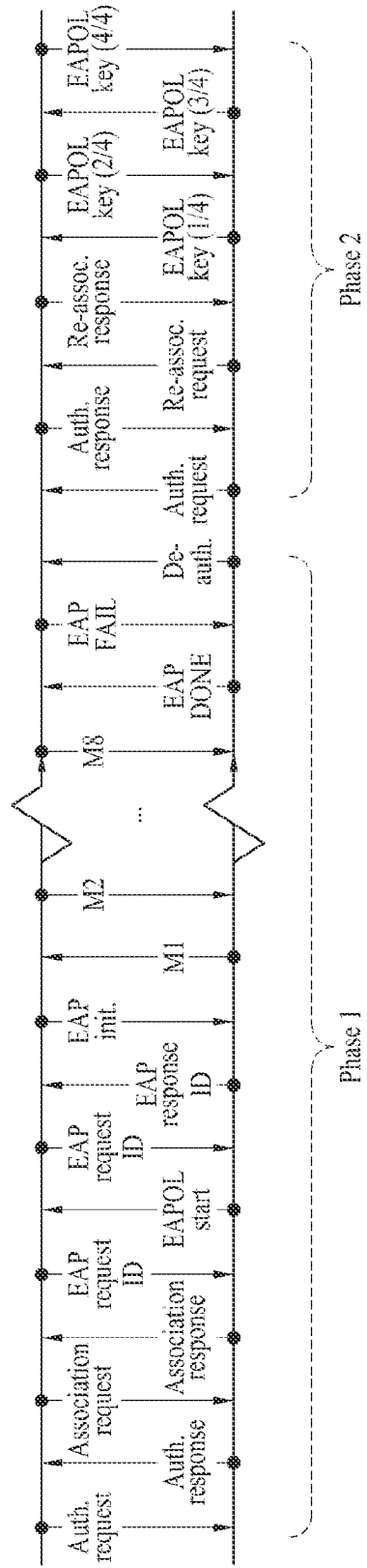
FIG. 10 shows a Wi-Fi Protected Setup (WPS) provisioning phase.

FIG. 10 shows a WPS provisioning phase. Referring to FIG. 10, the WPS provisioning phase is composed of two parts. In the first part (Phase 1), internal Registrar (P2P GO) is in charge of generating and issuing the network credentials, i.e., security keys, to the Enrollee (P2P Client). WPS is based on Wi-Fi Protected Access-2 (WPA-2) security and uses Advanced Encryption Standard (AES)-CCMP as cypher, and a randomly generated Pre-Shared Key (PSK) for mutual authentication. In the second part (Phase 2), the Enrollee (P2P Client) disassociates and reconnects using its new authentication credentials. If two devices already have the required network credentials (e.g., a case of the Persistent group formation), there is no need to trigger the first phase, and they can directly perform the authentication.

Proximity-Based Service (ProSe)

Recently, Proximity-based Service (ProSe) has been discussed in 3GPP. The ProSe enables different UEs to be connected (directly) each other (after appropriate procedure(s), such as a ProSe discovery, an authentication), through eNB only (but not further through Serving Gateway (S-GW, SGW)/Packet Data Network Gateway (PDN-GW, P-GW, PGW)), or through SGW/PGW (S/P-GW). The ProSe has various use cases and potential requirements for a network controlled discovery and communications between wireless devices that are in proximity, under continuous network control, and are under a 3GPP network coverage, for:

Commercial/social use
Network offloading
Public Safety
Integration of current infrastructure services, to assure the consistency of the user experience including reachability and mobility aspects
Public Safety, in case of absence of EUTRAN coverage (subject to regional regulation and operator policy, and limited to specific public-safety designated frequency bands and terminals)

Figure 11:
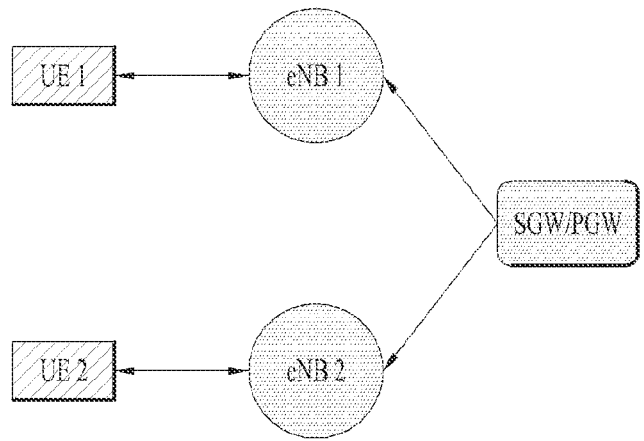
FIGS. 11, 12A and 12B show three types of data paths between two UEs when the data paths are established by ProSe Discovery.
Figure 12A:
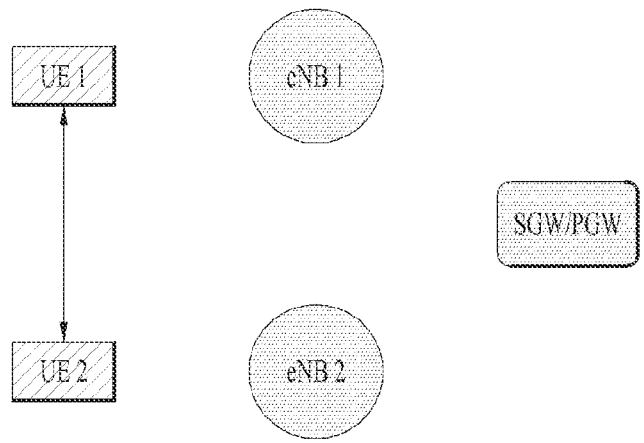
Figure 12B:
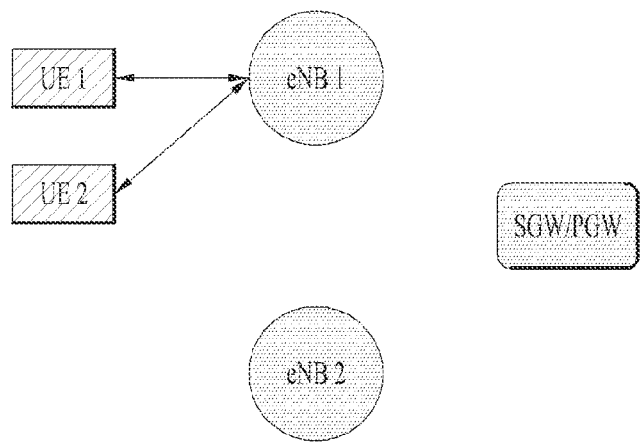
Figure 14:
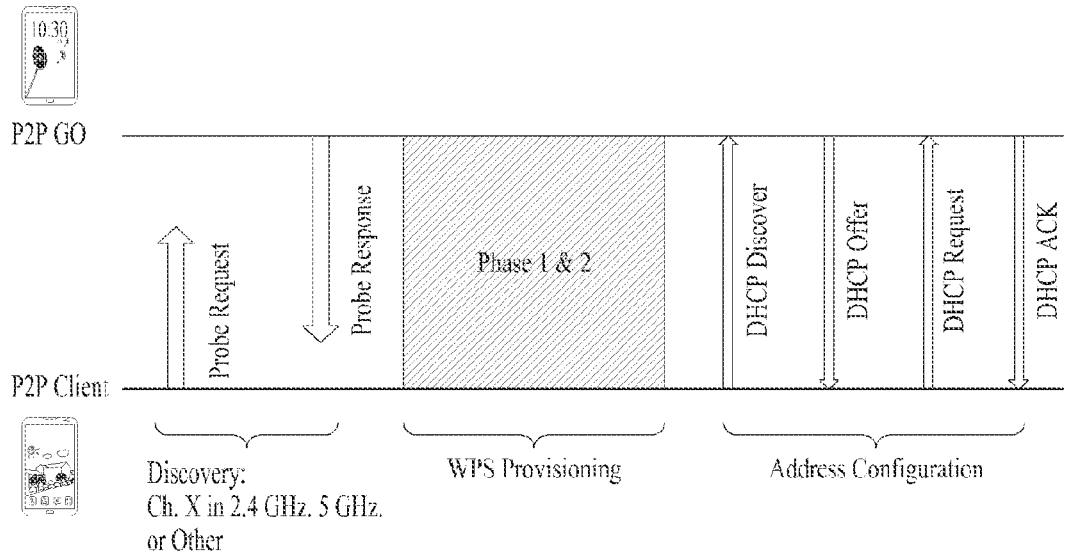
FIGS. 14-21 show P2P Group formation in accordance with Device-to-Device (D2D) modes of the present invention.
Figure 15:
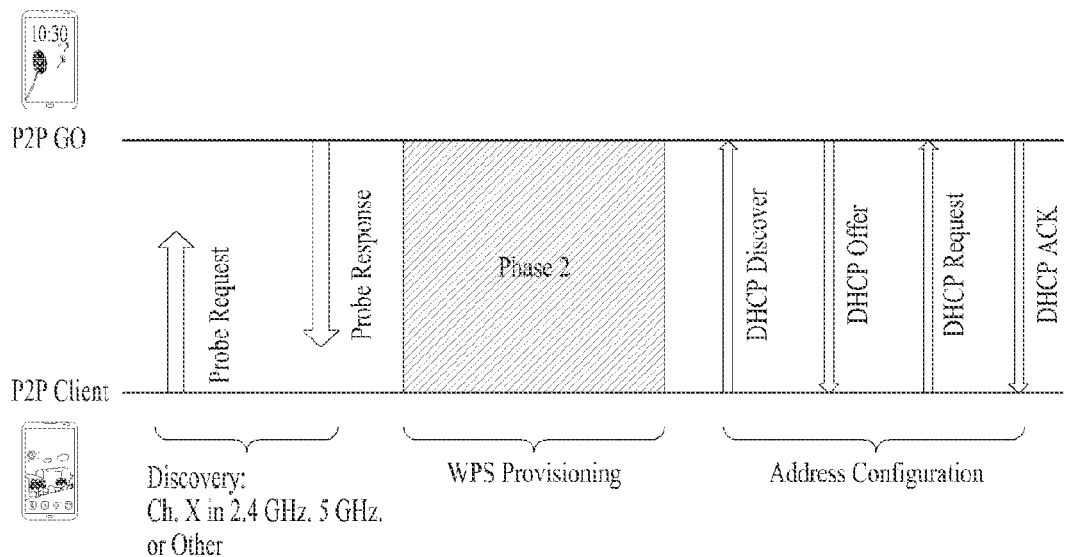
Figure 16:
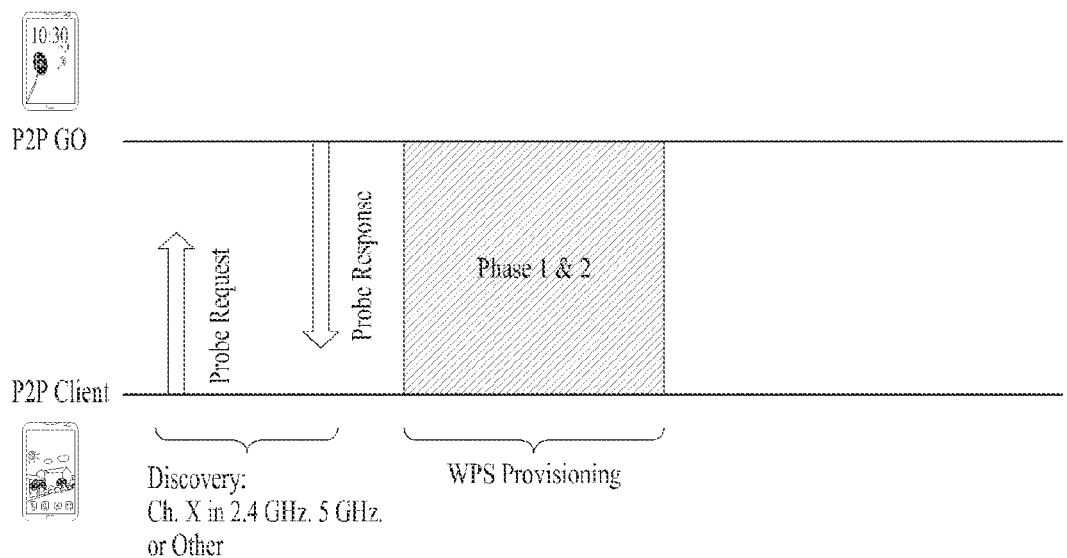
Figure 17:
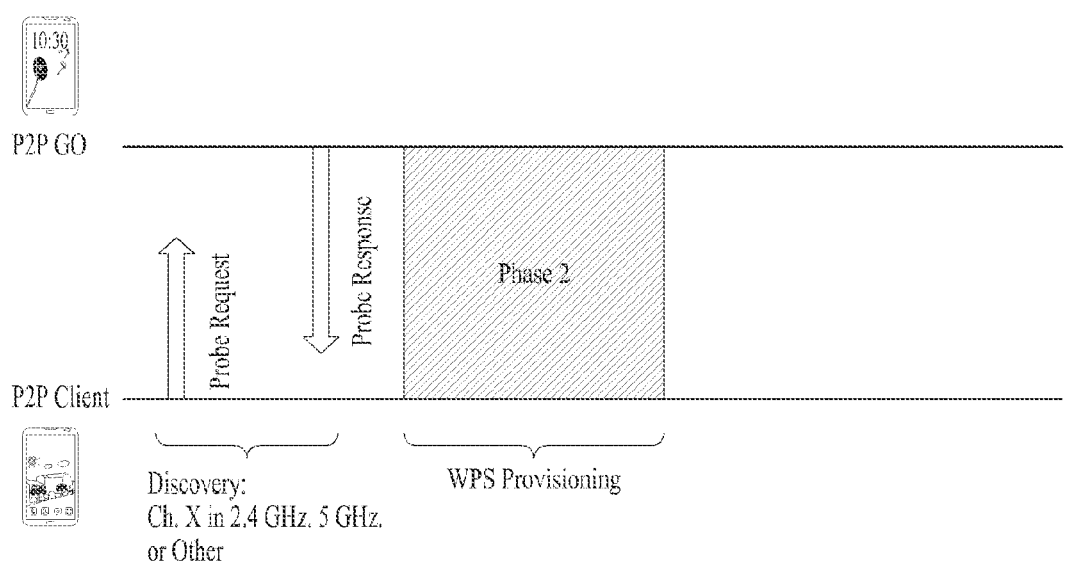
Figure 18:
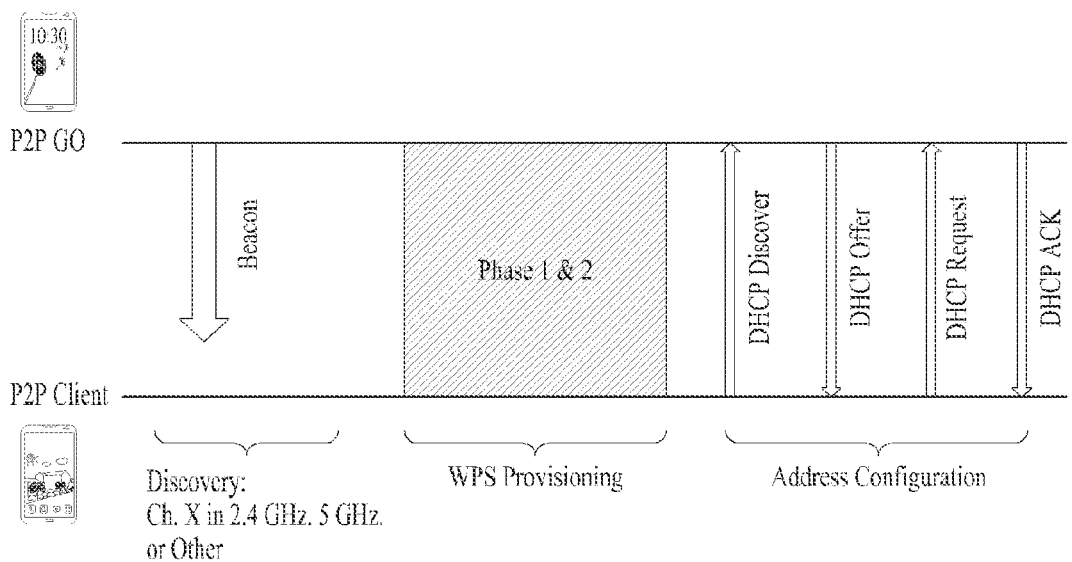
Figure 19:
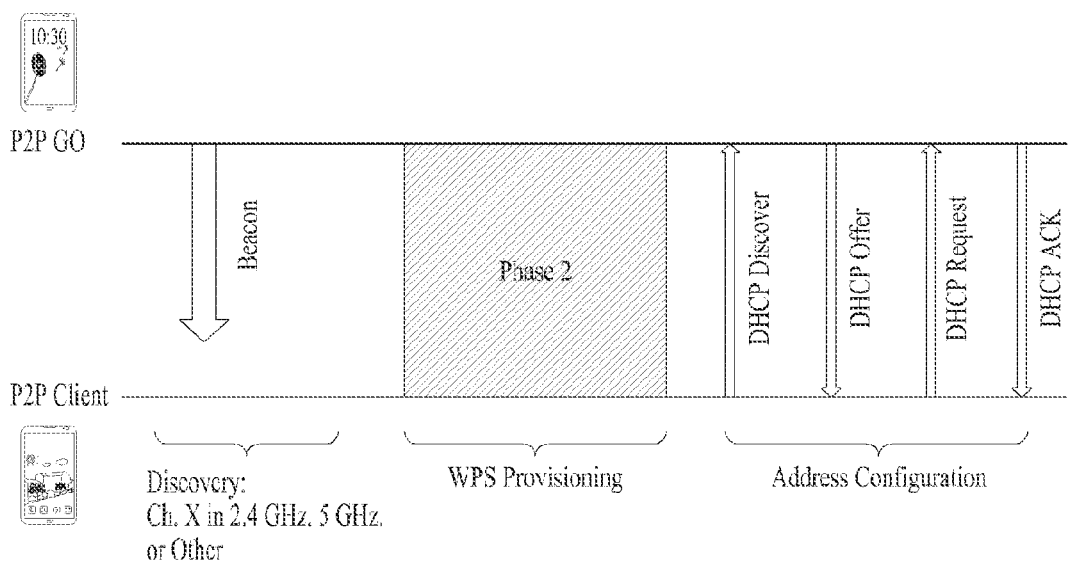
Figure 20:
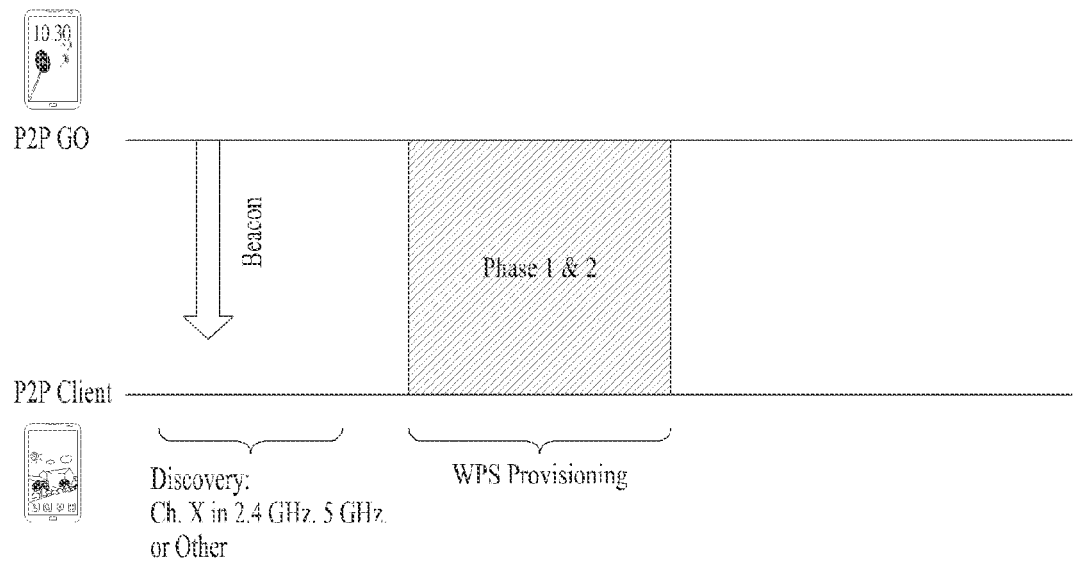
Figure 21:
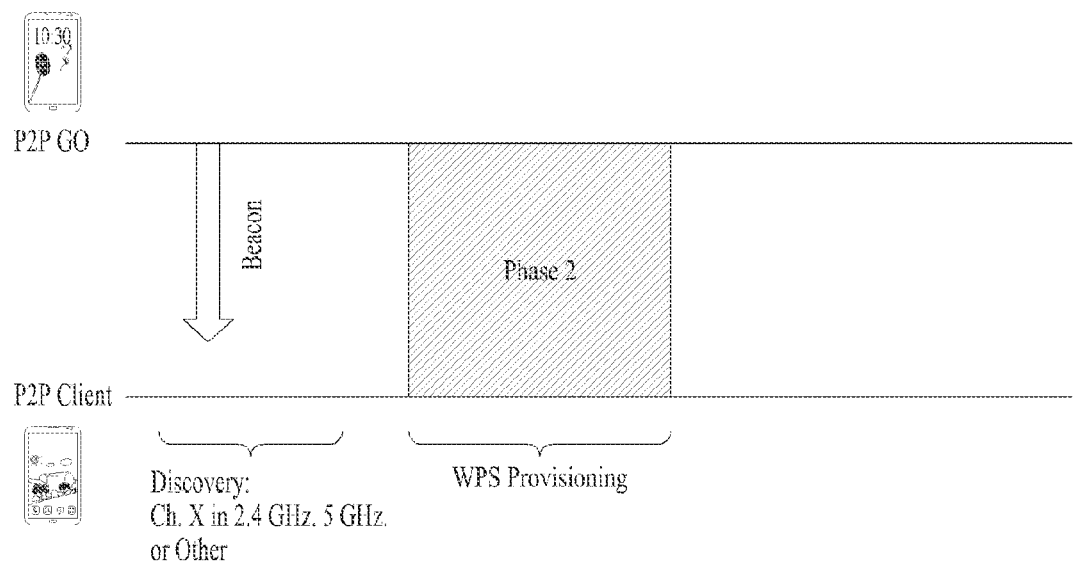

FIGS. 11, 12A and 12B show three types of data paths when the data paths are established by ProSe Discovery.

FIG. 11 shows an example of data path (or Evolved Packet Core Path (EPC Path)) in an Evolved Packet System (EPS) for communication between two UEs. Referring to FIG. 11, even when two UEs (e.g., UE1, UE2) in close proximity communicate with each other (after appropriate procedure(s), such as a ProSe discovery, an authentication), their data path (user plane) may go via the network (EPC Path). Thus the EPC Path for the communication involves eNB(s) and/or Gateway(s) (GW(s)) (e.g., SGW/PGW). The network may further include a network node related with the ProSe such as a ProSe server, a MME, and the like (hereinafter, ProSe-related node). The ProSe-related node may control a communication for proximity-based service. The ProSe-related node may be a part of the EPC Path or may be located out of the EPC Path.

FIGS. 12A~12B show two forms of data path scenarios for ProSe Communication between two UEs. FIG. 12A shows a direct mode data path in the EPS for communication between two UEs. FIG. 12B shows a locally-routed data path in the EPS for communication between two UEs when the UEs are served by the same eNB. In particular, if wireless devices (e.g., UE1, UE2) are in proximity of each other, they may be able to use a direct mode data path (FIG. 12A) or a locally routed data path (FIG. 12B). In the direct mode data path, wireless devices are connected directly each other (after appropriate procedure(s), such as a ProSe Discovery, an authentication), without eNB and SGW/PGW. In the locally routed data path, wireless devices under the coverage of the same eNB are connected to each other through the eNB (after appropriate procedure(s), such as a ProSe Discovery, an authentication).

Due to its huge market potential of ProSe, it is expected that the traffic volume would be even more fluctuating, causing the frequency of traffic congestion occurrence to increase and the level of congestion to be heavier to handle in the limited cellular bandwidth. As an efficient way of coping with this problem, off-loading of (on-going) ProSe traffic from E-UTRAN to WLAN may be an attractive solution to efficiently handle such congestions in the presence of various types of interference and factors caused by the ProSe connections in the E-UTRAN domain. In this invention, methods of transferring ProSe traffic/session from E-UTRAN domain to WLAN domain are proposed.

FIG. 13 shows an example of off-loading ProSe communication from E-UTRAN to WLAN in accordance with the present invention.

Referring to FIG. 13, two ProSe-enabled UEs (e.g., UE1 and UE2) may establish a communication connection for a proximity-based service in E-UTRAN domain and perform a ProSe communication in E-UTRAN domain (S1302). Establishment of the communication connection may include that UE1 and UE2 discover each other in the E-UTRAN. The communication connection may be established directly or via a network path.

During or before the ProSe communication is performed, UE1 and/or UE2 may send a message including WLAN capability to a network (e.g., BS) in E-UTRAN domain (S1304). The WLAN capability is used for a network to be able to off-load a ProSe communication (or session) from E-UTRAN to WLAN. Specifically, the network may know whether the associated UEs are WLAN-capable and WLAN-enabled based on the reported WLAN capability. Two methods can be considered for the report of the WLAN capability as follows.

Method 1: UE Report Based Method

UE Action: when UE is establishing a ProSe connection, the UE may report its WLAN capability. For example, WLAN-capable/non-capable, WLAN-supported/non-supported. WLAN-enabled/disabled, supportable WLAN version(s) (e.g., IEEE 802.11a, 11b, 11g, 11n, etc.)

Network Action: Network may reply to the report.

Method 2: Network Inquiry Based Method

Network Action: The network may send an inquiry message for the WLAN capability to UE(s) involved or to be (shortly) involved in ProSe communication.

UE Action: UE received the inquiry from the network, may report its WLAN capability. For example, WLAN-capable/non-capable, WLAN-supported/non-supported. WLAN-enabled/disabled, supportable WLAN version(s) (e.g., IEEE 802.11a, 11b, 11g, 11n, etc.).

Then, UEs (i.e., UE1 and UE2) in ProSe communications may be informed (indicated) that the network will transfer their ProSe communications from E-UTRAN to WLAN (S1306, S1308). The indication can be delivered using PDCCH with a ProSe-related ID (Identifier) (e.g., ProSe Group ID) (S1306). Specifically, the PDCCH signal may include downlink scheduling information and a CRC, wherein the CRC may be masked with a ProSe group ID. Alternatively, the indication can be delivered in a similar way that inter-frequency handovers are performed. Then, the content of indication may be delivered using PDSCH corresponding to the PDCCH (S1308). The content may be delivered as a part of SIB information via PDSCH. The content (in PDSCH or in a message of off-loading command, which is similar to that of inter-frequency handover) may include WLAN resources available for the ProSe communication. The content may include at least one of:

WLAN band information: e.g., 2.4 GHz, 5 GHz, or other.

Channel information for operation. For example, channels 1, 6, or 11 may be used in 2.4 GHz band.

Timer (Timing) information to specify the time instant at which this off-loading will be effective. Alternatively the timing information may indicate a time instant at which a procedure for establishing the ProSe connection through WLAN will be allowed.

As shown in FIGS. 9A~9C, three modes are defined in WFD: Standard, Autonomous, and Persistent P2P Group formation. However, these modes will cause signaling cost to rise in the process of off-loading: for example, increase in delay. Thus D2D modes are proposed so that the timespan required to complete the off-loading procedure can be reduced. Detailed explanation on D2D modes will be described later. One of D2D modes may be invoked when the network has decided to off-load the ProSe session/traffic to WLAN. If one of D2D modes is invoked, the content may further include at least one of:

P2P Group Owner (GO) information that the network specifies which UE will be acting as a GO and which UE(s) as a client(s) in WLAN domain.

Security information that will be used in WLAN for authentication purpose. This information may be a security key that will be used for mutual authentication in WLAN domain. The security information will reduce a group formation time (e.g., time interval required for checking identity of group members previously formed in E-UTRAN domain) in WLAN domain P2P Group ID (e.g., Service Set Identifier, SSID, alternatively WLAN group ID) that will be used in WLAN domain.

IP Addresses of UEs that will be used for the ProSe communication in WLAN domain. This will be the case that cellular operator also provides WLAN services and will help reduce a group formation time in WLAN domain. "IP Addresses that will be used in WLAN domain" may imply that IP address can be changed in the process of off-loading. Alternatively, the IP addresses of UEs may be replaced with device addresses of UEs for the ProSe communication.

P2P .Device Address that will be used, e.g., P2P Invitation, Device Discoverability, etc.

P2P Interface Address that will be used after a Group is formed.

After UEs (i.e., UE1 and UE2) in ProSe communications are informed (indicated) that the network will transfer their ProSe communications from E-UTRAN to WLAN, UE1 and UE2 may release the ProSe communication in E-UTRAN domain. Then UE1 and UE2 may establish a communication connection for the proximity-based service in WLAN domain based on WLAN resources of Step S1308 and D2D mode. For example, the establishing the communication connection for the proximity-hosed service in WLAN domain may include: transmitting a probe request message for initiating a WLAN direct communication in a WLAN band and a WLAN channel indicated by the WLAN band information and the WLAN channel information of the PDSCH signal. Also, the establishing the communication connection for the proximity-based service in WLAN domain may include: setting up IP configuration by using the IP addresses or the device addresses in the PDSCH signal. Also, the establishing the communication connection for the proximity-based service in WLAN domain may include: performing a Wi-Fi Protected Setup (WPS) provisioning procedure by using the security information in the PDSCH signal. Then UE1 and UE2 may perform a ProSe communication in WLAN domain (S1310). For example, UE2 exchanges WLAN radio signals with its peer UE (i.e., UE1) in accordance with the ProSe connection.

In addition, UE1 and/or UE2 may keep monitoring a PDCCH signal in E-UTRAN domain while the ProSe communication in WLAN domain is maintained (e.g., while WLAN radio signals are exchanged). If UE1 and/or UE2 receive a PDCCH signal indicating that the network will transfer their ProSe communications from WLAN to E-UTRAN, UE1 and/UE2 release the ProSe communication in WLAN domain, and re-establish a communication connection for the proximity-based service in E-UTRAN domain. As an example, as shown in Step S1306, the PDCCH signal may have CRC scrambled with ProSe related ID. Alternatively, the PDCCH signal may include a PDCCH signal for paging, and paging occasions are determined in a ProSe service specific way by using the ProSe-related ID (e.g., ProSe group ID). Paging Occasion (PO) means a subframe where there may be P-RNTI transmitted on PDCCH. In both cases, for indicating that the network will transfer their ProSe communications from E-UTRAN to WLAN, specific fields of the PDCCH signal (i.e., DCI format) may be set to as shown in Table 1, and PDSCH signal of Step S1308 may be omitted.

TABLE 1

|  | DCI format 1/1A | DCI format 2/2A/2B/2C |
|---|---|---|
| TPC command for scheduled PUSCH | N/A | N/A |
| Cyclic shift DM RS | N/A | N/A |
| Modulation and coding scheme and redundancy version | N/A | N/A |
| HARQ process number | FDD: set to '000' TDD: set to '0000' | FDD: set to '000' TDD: set to '0000' |
| Modulation and coding scheme | MSB is set to '0' | For the enabled transport block: MSB is set to '0' |
| Redundancy version | set to '00' | For the enabled transport block: set to '00' |

Each phase of the typical P2P Group formation in WLAN domain (FIGS. 9A~9C and 10) may be simplified in accordance with the WLAN resource(s) (FIG. 13, S1308) as follows.

A. Discovery Phase: it is noted that this is not a conventional ProSe Discovery. In the present Discovery Phase, UEs involved with ProSe Communication are already aware of each other no matter the off-loading procedure has started. The present Discovery Phase means a procedure when two or more UEs (e.g., UEs in E-UTRAN with WEAN capability) are supposed to initiate a WLAN direct communication session. In the present Discovery Phase, the group owner and client(s) already specified in E-UTRAN domain (e.g., LTE/LTE-Advanced domain) may go to the channel, e.g., in operating frequency band, e.g., channel 6 in 2.4 GHz. Two ways of discovering each other are possible as follows.

Active scanning approach: Group client(s) may send a Probe Request and group owner may respond with Probe Response. Since both transmissions happen in a WLAN channel directed in E-UTRAN domain, the time required in discovery phase is much shorter than that required in Standard Wi-Fi Direct case.

Passive scanning approach: Group owner may send a beacon signal and group clients may get the necessary information in the received beacon signal.

B. WPS Phase: two ways of security checking each other are possible as follows.

Phase 1&2: Case where no security credential(s) is provided in E-UTRAN domain.

Phase 2: Case where security credential(s) is provided in E-UTRAN domain.

C. Address Configuration Phase: two approaches are possible as follows.

4 way hand-shaking: Case where no IP addresses are provided in E-UTRAN domain.

Skip the phase: Case where IP addresses are provided in E-UTRAN domain.

FIGS. 14~21 show P2P Group formation in accordance with D2D modes of the present invention. Referring to FIGS. 14~21, various D2D modes are possible based on the WLAN resource(s) (FIG. 13, S1308). D2D mode may be semi-statically configured via a higher layer signal (e.g., RRC signal) or dynamically indicated by a D2D mode indicator in a MAC signal or a PDCCH signal. Contents of the WLAN resource(s) (e.g., PDSCH signal) may be consisted of a set of consecutive fields depending on a configured D2D mode, and a position of each field in the set of consecutive fields may be predetermined depending on the configured D2D mode.

D2D mode 1 (FIG. 14): Active Scanning approach in Discovery phase (i.e., Probe Request/Probe Response). No security credentials are provided in LTE/LTE-Advanced domain, and thus Phase 1 & 2 are performed in WPS provisioning phase. No IP address is provided in LTE/LTE-Advanced domain, and thus Address configuration phase is performed.

D2D mode 2 (FIG. 5): Active Scanning approach in Discovery phase. Security credentials are provided in LTE/LTE-Advanced domain, and thus Phase 1 is skipped in WPS provisioning phase (i.e., only Phase 2 is performed). No IP address is provided in LTE/LTE-Advanced domain, and thus Address configuration phase is performed.

D2D mode 3 (FIG. 16): Active Scanning approach in Discovery phase. No security credentials are provided in LTE/LTE-Advanced domain, and thus Phase 1 & 2 are performed in WPS provisioning phase. IP address is provided in LTE/LTE-Advanced domain, and thus Address configuration phase is skipped.

D2D mode 4 (FIG. 17): Active Scanning approach in Discovery phase. Security credentials are provided in LTE/LTE-Advanced domain, and thus Phase 1 is skipped in WPS provisioning phase (i.e., only Phase 2 is performed). IP address is provided in LTE/LTE-Advanced domain, and thus Address configuration phase is skipped.

D2D mode 5 (FIG. 18): Passive Scanning approach in Discovery phase (i.e., listening beacon). No security credentials are provided in LTE/LTE-Advanced domain, and thus Phase 1 & 2 are performed in WPS provisioning phase. No IP address is provided in LTE/LTE-Advanced domain, and thus Address configuration phase is performed.

D2D mode 6 (FIG. 19): Passive Scanning approach in Discovery phase. Security credentials are provided in LTE/LTE-Advanced domain, and thus Phase 1 is skipped in WPS provisioning phase (i.e., only Phase 2 is performed). No IP address is provided in LTE/LTE-Advanced domain, and thus Address configuration phase is performed.

D2D mode 7 (FIG. 20): Passive Scanning approach in Discovery phase. No security credentials are provided in LTE/LTE-Advanced domain, and thus Phase 1 & 2 are performed in WPS provisioning phase. IP address is provided in LTE/LTE-Advanced domain, and thus Address configuration phase is skipped.

D2D mode 8 (FIG. 21): Passive Scanning approach in Discovery phase. Security credentials are provided in LTE/ LTE-Advanced domain, and thus Phase 1 is skipped in WPS provisioning phase (i.e., only Phase 2 is performed). IP address is provided in LTE/LTE-Advanced domain, and thus Address configuration phase is skipped.

Figure 22:
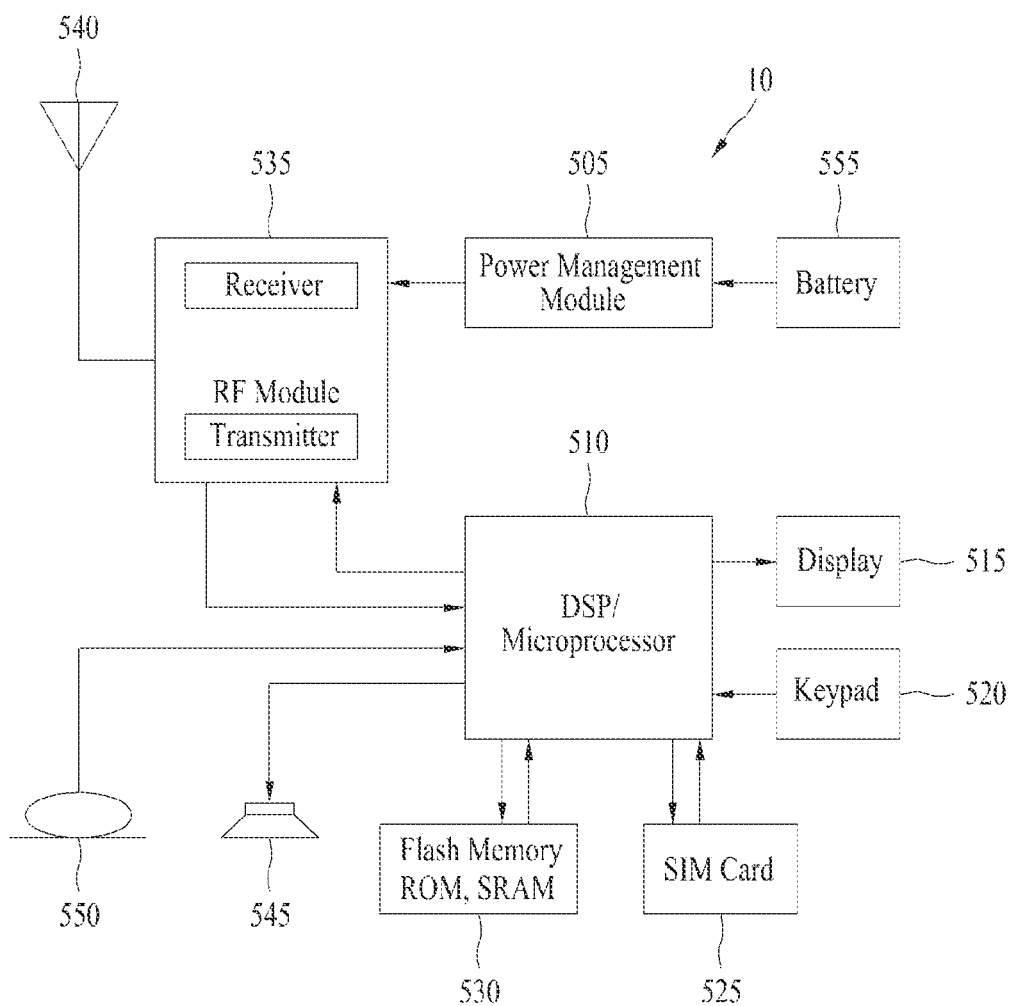
FIG. 22 shows a block diagram of a UE or Mobile Station (MS).

FIG. 22 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, for cooperative discovery (i.e., node cooperation) for the proximity-based service.

The invention claimed is:

1. A method of performing a Proximity-based Service (ProSe) communication by a User Equipment (UE) in a cellular communication system, the method comprising:
receiving, from a Base Station (BS), a first Physical Downlink Control Channel (PDCCH) signal including scheduling information and a Cyclic Redundancy Check (CRC), wherein the CRC is masked with a ProSe-related Identifier (ID);
receiving, from the BS, a Physical Downlink Shared Channel (PDSCH) signal using the scheduling information, wherein the PDSCH signal includes Wireless Local Area Network (WLAN) resources available for the ProSe communication;
establishing a ProSe connection with a peer UE by using the WLAN resources; and
exchanging WLAN radio signals with the peer UE in accordance with the ProSe connection,
wherein the UE is configured to keep monitoring a second PDCCH signal during the WLAN radio signals are exchanged.

2. The method of claim 1, wherein the WLAN resources available for the ProSe communication further includes WLAN band information and WLAN channel information.

3. The method of claim 2, wherein the establishing the ProSe connection includes:
transmitting a probe request message for initiating a WLAN direct communication in a WLAN band and a WLAN channel indicated by the WLAN band information and the WLAN channel information of the PDSCH signal.

4. The method of claim 1, wherein the PDSCH signal further includes timing information indicating a time instant at which a procedure for establishing the ProSe connection through WLAN is allowed.

5. The method of claim 1, wherein the PDSCH signal further includes IP addresses of UEs for the ProSe communication or device addresses of UEs for the ProSe communication.

6. The method of claim 5, wherein the establishing the ProSe connection includes:
setting up IP configuration by using the IP addresses or the device addresses in the PDSCH signal.

7. The method of claim 1, wherein the PDSCH signal further includes security information.

8. The method of claim 7, wherein the establishing the ProSe connection includes:
performing a Wi-Fi Protected Setup (WPS) provisioning procedure by using the security information in the PDSCH signal.

9. The method of claim 1, wherein the PDSCH signal further includes information indicating a group owner for the ProSe connection in WLAN domain.

10. The method of claim 1, wherein the PDSCH signal further includes a WLAN group ID.

11. The method of claim 1, further comprising:
reporting WLAN capability of the UE to the BS, wherein the WLAN capability includes first information indicating whether WLAN is supported or not.

12. The method of claim 11, wherein if the UE supports WLAN, the WLAN capability further includes second information indicating one or more supportable WLAN Versions.

13. The method of claim 1, wherein the second PDCCH signal includes a PDCCH signal for paging, and paging occasions are determined by using the ProSe-related ID.

14. A User Equipment (UE) configured to perform a Proximity-based Service (ProSe) communication in a cellular communication system, the UE comprising:
a radio frequency (RF) unit; and
a processor, wherein the processor is configured to:
receive, from a Base Station (BS), a first Physical Downlink Control Channel (PDCCH) signal including scheduling information and a Cyclic Redundancy Check (CRC), wherein the CRC is masked with a ProSe-related Identifier (ID),
receive, from the BS, a Physical Downlink Shared Channel (PDSCH) signal using the scheduling information, wherein the PDSCH signal includes Wireless Local Area Network (WLAN) resources available for the ProSe communication;
establish a ProSe connection with a peer UE by using the WLAN resources, and
exchange WLAN radio signals with the peer UE in accordance with the ProSe connection,
wherein the UE is configured to keep monitoring a second PDCCH signal during the WLAN radio signals are exchanged.

15. The UE of claim 14, wherein the WLAN resources available for the ProSe communication further includes WLAN band information and WLAN channel information.

16. The UE of claim 15, wherein the establishing the ProSe connection includes:
transmitting a probe request message for initiating a WLAN direct communication in a WLAN band and a WLAN channel indicated by the WLAN band information and the WLAN channel information of the PDSCH signal.

17. The UE of claim 14, wherein the PDSCH signal further includes timing information indicating a time instant at which a procedure for establishing the ProSe connection through WLAN is allowed.

18. The UE of claim 14, wherein the PDSCH signal further includes IP addresses of UEs for the ProSe communication or device addresses of UEs for the ProSe communication.

19. The UE of claim 18, wherein the establishing the ProSe connection includes:

setting up IP configuration by using the IP addresses or the device addresses in the PDSCH signal.

20. The UE of claim 14, wherein the PDSCH signal further includes security inform ion.

21. The UE of claim 20, wherein the establishing the ProSe connection includes:

performing a Wi-Fi Protected Setup (WPS) provisioning procedure by using the security information in the PDSCH signal.

22. The UE of claim 14, wherein the PDSCH signal further includes information indicating a group owner for the ProSe connection in WLAN domain.

23. The UE of claim 14, wherein the PDSCH signal further includes a WLAN group ID.

24. The UE of claim 14, wherein the processor is further configured to:

report WEAN capability of the UE to the BS, wherein the WLAN capability includes first information indicating whether WLAN is supported or not.

25. The UE of claim 24, wherein if the UE supports WLAN, the WLAN capability further includes second information indicating one or more supportable WLAN versions.

26. The UE of claim 14, wherein the second PDCCH signal includes a PDCCH signal for paging, and paging occasions are determined by using the ProSe-related ID.

* * * * *